United States Patent [19]
Kim et al.

[11] Patent Number: 6,038,224
[45] Date of Patent: Mar. 14, 2000

[54] DATA CONTROL SYSTEM IN CDMA MOBILE COMMUNICATION SYSTEM

[75] Inventors: Tae Won Kim; Byung Keun Lim, both of Kyungki-do, Rep. of Korea

[73] Assignee: LG Information & Communications, Ltd., Seoul, Rep. of Korea

[21] Appl. No.: 08/978,619

[22] Filed: Nov. 26, 1997

[30] Foreign Application Priority Data

Nov. 27, 1996 [KR] Rep. of Korea .......................... 58354

[51] Int. Cl.[7] ................................................. H04B 7/216
[52] U.S. Cl. ........................ 370/342; 370/335; 455/560
[58] Field of Search .................................. 370/310, 328, 370/329, 335, 338, 342, 389, 395; 455/39, 500, 507, 517, 524, 525, 73, 550, 560

[56] References Cited

U.S. PATENT DOCUMENTS

| | | | |
|---|---|---|---|
| 5,570,367 | 10/1996 | Ayanoglu et al. | 370/346 |
| 5,729,536 | 3/1998 | Doshi et al. | 370/328 |
| 5,742,592 | 4/1998 | Scholefield et al. | 370/329 |
| 5,832,389 | 11/1998 | Dent | 455/562 |

*Primary Examiner*—Ajit Patel
*Assistant Examiner*—Bob A. Phunkulh
*Attorney, Agent, or Firm*—Fleshner & Kim

[57] ABSTRACT

A data control system in a CDMA mobile communication system can achieve data communication with a public network subscriber, even if a modem is not mounted on a computer of a mobile telephone subscriber, and simultaneously minimize data transmission error rate even in an irregular environment of radio data transmitting/receiving sections between a mobile telephone and a radio base station.

4 Claims, 6 Drawing Sheets

FIG.5A

| preamble 4 byte | message 4 byte | encoding packet 32 byte | CRC 2 | F 1 | idle pattern 4 byte |
|---|---|---|---|---|---|

FIG.5B

| preamble 3 byte | message 4 byte | encoding packet 32 byte |
|---|---|---|

FIG.5C

| | |
|---|---|
| 1 | traffic channel data rate |
| 2 | traffic information format |
| 3 | control signal code |
| 4 | information frame management number |
| 5<br>6<br>7<br>8 | not-defined(reserved) |
| 9<br>10<br>⋮<br>28 | data information(20 byte) |
| 29<br>⋮<br>32 | nonuse(4 byte) |

DATA CONTROL SYSTEM IN CDMA MOBILE COMMUNICATION SYSTEM

BACKGROUND OF THE INVENTION

1. Field of the Invention

The present invention relates to a mobile communication system using a code division multiple access (hereinafter referred to as "CDMA") method, and more particularly, to a data control system in a CDMA mobile communication system which can provide mobile data communication to a mobile telephone subscriber, in addition to voice service, by using a CDMA mobile communication device.

2. Discussion of Related Art

Generally, a CDMA mobile communication network exchanges by radio a voice signal between a mobile telephone and a telephone through a base station and a switching system, in a CDMA method.

To this end, a conventional mobile communication system includes radio base stations which ensure the mobile telephones by regions and controls them and a controller and a switching system which control each of the radio base stations and connect the distance between the radio base station and adjacent one thereto to achieve the transmission of the radio signal.

In the conventional mobile communication system, however, only the voice signal communication is possible through the mobile communication network and data communication provided through a wire communication network such as a public switching telephone network (hereinafter referred to as "PSTN") is not possible. Therefore, the successful achievement of the data communication through the wire communication network is possible by means of a modem which is mounted on a computer. In other words, the modems should be mounted on all of computers in order to achieve the data communication through the wire communication network.

SUMMARY OF THE INVENTION

Accordingly, the present invention is directed to a data control system in a CDMA mobile communication system that substantially obviates one or more of the problems due to limitations and disadvantages of the related art.

An object of the invention is to provide a data control system in a CDMA mobile communication system which can achieve data communication with a public network subscriber, even if a modem is not mounted on a computer of a mobile telephone subscriber, and simultaneously minimize data transmission error rate even in an irregular environment of radio data transmitting/receiving sections between a mobile telephone and a radio base station.

To accomplish this and other objects of the present invention, a data control system in a CDMA mobile communication system having a mobile telephone which is provided with a serial input/output (SIO) port connectable to a computer, a radio base station which receives/transmits a radio wave applied from each mobile telephone of a mobile telephone subscriber, and a base station controller and mobile switching system which controls the radio base station installed by areas and exchange a voice signal by connecting the radio base stations to each other, the data control system includes: a connection device to mobile data which receives an asynchronous mobile data communication service request message by the mobile telephone subscriber from the base station controller and mobile switching system and if communication is made with a public network subscriber, transmits/receives asynchronous mobile data to/from the mobile telephone subscriber along a mobile data path through the base station controller and mobile switching system; a connection device to public network data which receives the asynchronous mobile data communication service request message by a public network subscriber from the base station controller and mobile switching system and if communication is made with the mobile telephone subscriber, transmits/receives the asynchronous mobile data to/from the public network subscriber along a public network data path through the base station controller and mobile switching system; a data processing device which modem-processes the asynchronous mobile data from the mobile telephone subscriber by occupying an idle modem resource for asynchronous mobile data communication and by connecting a channel B to the mobile telephone subscriber to thereby output the processed data as the public network data and protocol-processes the asynchronous mobile data from the public network subscriber by assigning a modem resource of a modem port and by connecting one channel to the public network data to thereby output the processed data as the mobile data; a switching device which outputs the asynchronous mobile data outputted from the data processing device to the connection device to the public network data and outputs the asynchronous mobile data from the public network subscriber to the connection device to the mobile data, while transmitting the asynchronous mobile data from the connection device to the mobile data and the connection device to the public network data to the data processing device; and a main processing device which assigns the idle modem resource for the asynchronous mobile data communication, if the asynchronous mobile data communication service request exists by the mobile telephone subscriber from the connection device to the mobile data and then checks whether the idle modem resource is occupied by the data processing device and the connection state of the channel B, to thereby set the mobile data path between the data processing device and the connection device to the mobile data through the switching device and at the same time checks the modem resource in which modem environment is constructed by using the channel B of the data processing device and the connection state of the one channel assigned to the public network data, to thereby set the public network data path between the data processing device and the connection device to the public network data through the switching device.

Preferably, the data processing device is comprised of a main controller for occupying the idle modem resource in accordance with the signal from the main processing device, controlling the connection of channel B, and constituting a user modem environment using the channel B by the main processing device, based upon the setting of the mobile data path; a protocol processor for inputting and outputting the asynchronous mobile data from the mobile telephone subscriber from the switching device through the channel B port assigned by the main controller and for converting the asynchronous mobile data from the public network subscriber inputted through the public network path to be adapted for the channel B communication to thereby output the converted data to the switching device; a modem processor for detecting a carrier, if incoming and calling command signals are inputted from the main processing device, and if link between modems is set, for inputting the asynchronous mobile data from the public network subscriber from the switching device to thereby output the inputted data to the protocol processor and for inputting and modem-processing the asynchronous mobile data from the mobile telephone subscriber outputted from the protocol processor to thereby output the processed data to the switching device; and an application interface controller for interfacing data between the protocol processor and the modem processor and transmitting the command of the main controller to each of them.

In the data processing device, on the other hand, the protocol processor is preferably comprised of: a transmission controller for detecting and correcting error of data inputted/outputted to/from the application interface controller; an inter-terminating point link controller for building a protocol stack between terminating points of link hierarchy, transmission hierarchy and application interface hierarchy between the data processing device in the mobile data communication control system and a personal computer after setting the mobile data path; a transmission interrupting routine for transmitting data from the public network subscriber to the mobile communication subscriber; a reception interrupting routine for transmitting data from the mobile communication subscriber to the public network subscriber; an SVCM controlling and managing part for managing signalling with a selector vocorder controller of the base station controller and mobile switching system; and a transmission frame forming and releasing part for forming or releasing a frame of transmitting/receiving data in a PCM system.

In the data processing device, furthermore, the modem processor preferably includes: a modem controller for detecting and correcting error of data inputted/outputted to/from the application interface controller; a transmission interrupting routine for transmitting data from the mobile communication subscriber to the public network subscriber; a reception interrupting routine for transmitting data from the public network subscriber to the mobile communication subscriber; and a modem and a modem controller connected with a modem of the public network subscriber through the public network, for transmitting/receiving data to/from the modem.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings.

In the drawings:

FIG. 5A is a format diagram illustrating a data frame between the vocorder and the transmission frame forming and releasing module of FIG. 4A;

FIG. 5B is a format diagram illustrating a data frame of the SVCM controlling and managing module of FIG. 4A; and FIG. 5C is a data format diagram illustrating the encoding packet of FIG. 4A.

DETAILED DESCRIPTION OF PREFERRED EMBODIMENT

Reference will now be made in detail to the preferred embodiments of the present invention, examples of which are illustrated in the accompanying drawings.

Figure 1:
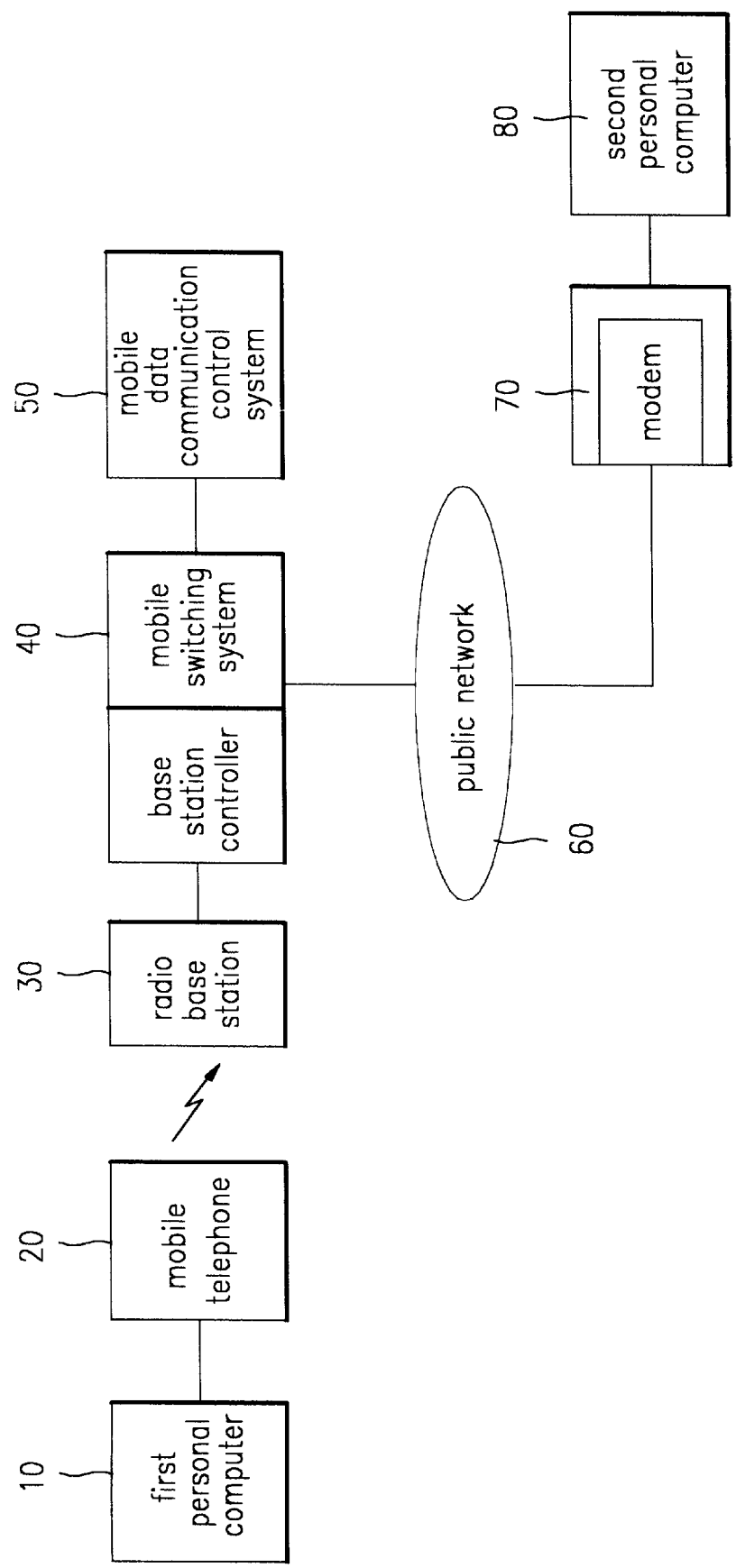
FIG. 1 is a block diagram illustrating a basic construction of a CDMA mobile data communication system for executing mobile data communication with a public network subscriber according to the present invention.

FIG. 1 is a block diagram illustrating a basic construction of a CDMA mobile data communication system according to the present invention, in which a mobile communication subscriber can execute the mobile data communication with a public network subscriber by using the CDMA communication network.

As shown in FIG. 1, in the basic construction for the mobile data communication, there are provided a first personal computer 10, a mobile telephone 20, a radio base station 30, a base station controller and mobile switching system 40, a mobile data communication control system 50, a public network 60, a modem 70 and a second personal computer 80.

For the data communication service under the existing public network, the first personal computer like the second personal computer also should mount the modem 70 thereon, but in the mobile data communication system according to the present invention the mobile telephone 20 is connected to the first personal computer of the mobile telephone subscriber which executes the data communication, to thereby provide the mobile data communication service by radio with the existing public network subscriber.

Hence, the connection of the first personal computer 10 with the mobile telephone 20 is made by means of the SIO port, and a communication channel setting method of the existing mobile telephone is directly applied between the mobile telephone 20 and the radio base station 30.

On the other hand, the base station controller and mobile switching system 40 checks whether the applied mobile data is voice traffic or mobile data traffic and if it corresponds to the voice traffic, connects the data with other side's subscriber through the mobile switching system. However, if the mobile data corresponds to the mobile data traffic, the base station controller and mobile switching system 40 connects a call to the mobile data communication control system 50 through the mobile switching system, such that the mobile telephone subscriber can achieve the mobile data communication with his desired public network subscriber.

If an opposite party's telephone number is inputted in the first personal computer 10, the inputted telephone number is converted into a calling message on a radio communication network in the mobile telephone 20 and is then transmitted to the radio base station 30.

Then, the calling message is transmitted to the base station controller and mobile switching system 40, in which it is checked whether or not the message is a mobile data communication service request message to thereby set the connection with the mobile data communication control system 50.

Accordingly, the mobile telephone subscriber can execute the mobile data communication with his desired public network subscriber by the mobile data communication control system 50.

Now, an explanation of the construction of the mobile data communication control system as shown in the above will be discussed with reference to FIGS. 2 and 3.

The mobile data communication control system 50 constructed according to the present invention includes a connection device to mobile data 51, a connection device to public network data 52, a data processing device 53, a switching device 54, and a main processing device 55. As shown in FIG. 2, the thick solid lines represent a signal and traffic path, the thin solid lines represent a signal path, and the dotted lines represent a traffic path. The detailed construction of the data processing device 53 is shown in FIG. 3.

The connection device to the mobile data 51 receives the mobile data communication service request message by the mobile telephone subscriber from the base station controller and mobile switching system 40, and if the communication connection is made with the public network subscriber, transmits/receives the mobile data to/from the mobile telephone subscriber along the mobile data path through the base station controller and mobile switching system 40.

The connection device to the public network data 52 receives the mobile data communication service request message by the public network subscriber from the base station controller and mobile switching system 40, and if the communication connection is made with the mobile telephone subscriber, transmits/receives the mobile data to/from the public network subscriber along the public network path through the base station controller and mobile switching system 40.

The data processing device 53 modem-processes the mobile data from the mobile telephone subscriber by occupying an idle modem resource of a channel B port for the mobile data communication and by connecting a channel B to the mobile telephone subscriber to thereby output the processed data as the public network data and protocol-processes the mobile data from the public network subscriber by assigning a modem resource of a modem port and by connecting one channel to the public network data to thereby output the processed data as the mobile data.

The switching device 54 outputs the mobile data outputted from the data processing device 53 to the connection device to the public network data 52 and outputs the mobile data from the public network subscriber to the connection device to the mobile data 51, while transmitting the mobile data from the connection device to the mobile data 51 and the connection device to the public network data 52 to the data processing device 53.

The main processing device 55 assigns the idle modem resource for the mobile data communication, if the mobile data communication service request exists by the mobile telephone subscriber from the connection device to the mobile data 51 and then checks whether the idle modem resource is occupied by the data processing device 53 and the connection state of the channel B, to thereby set the mobile data path between the data processing device 53 and the connection device to the mobile data 51 through the switching device 54 and at the same time checks the modem resource in which modem environment is constructed by using the channel B of the data processing device 53 and the connection state of the one channel assigned to the public network data, to thereby set the public network data path between the data processing device 53 and the connection device to the public network data 52 through the switching device 54.

On the other hand, an explanation of the construction of the data processing device 53 of FIG. 3 will be hereinafter discussed.

The data processing device 53 is comprised of a main controller 53*a*, a protocol processor 53*b*, a modem processor 53*c* and an application interface controller 53*d*.

The main controller 53*a* occupies the idle modem resource in accordance with application of the signal from the main processing device 55, controls the connection of channel B, and controls a user modem environment using the channel B by the main processing device 55, based upon the setting of the mobile data path.

The protocol processor 53*b* inputs and outputs the mobile data from the mobile telephone subscriber from the switching device 54 through the channel B port assigned by the main controller 53*a* and converts the mobile data from the public network subscriber inputted through the public network path to be adapted for the channel B communication to thereby output the converted data to the switching device 54.

The modem processor 53*c* inputs the mobile data from the public network subscriber from the switching device 54, if link between modems is set after incoming and calling command signals are inputted from the main processing device 55, to thereby output the inputted data to the protocol processor 53*b* and inputs and modem-processes the mobile data from the mobile telephone subscriber outputted from the protocol processor 53*b* to thereby output the processed data to the switching device 54.

Finally, the application interface controller 53*d* interfaces data between the protocol processor 53*b* and the modem processor 53*c* and transmits the command of the main controller 53*a* to each of the protocol processor 53*b* and the modem processor 53*c*.

Figure 2:
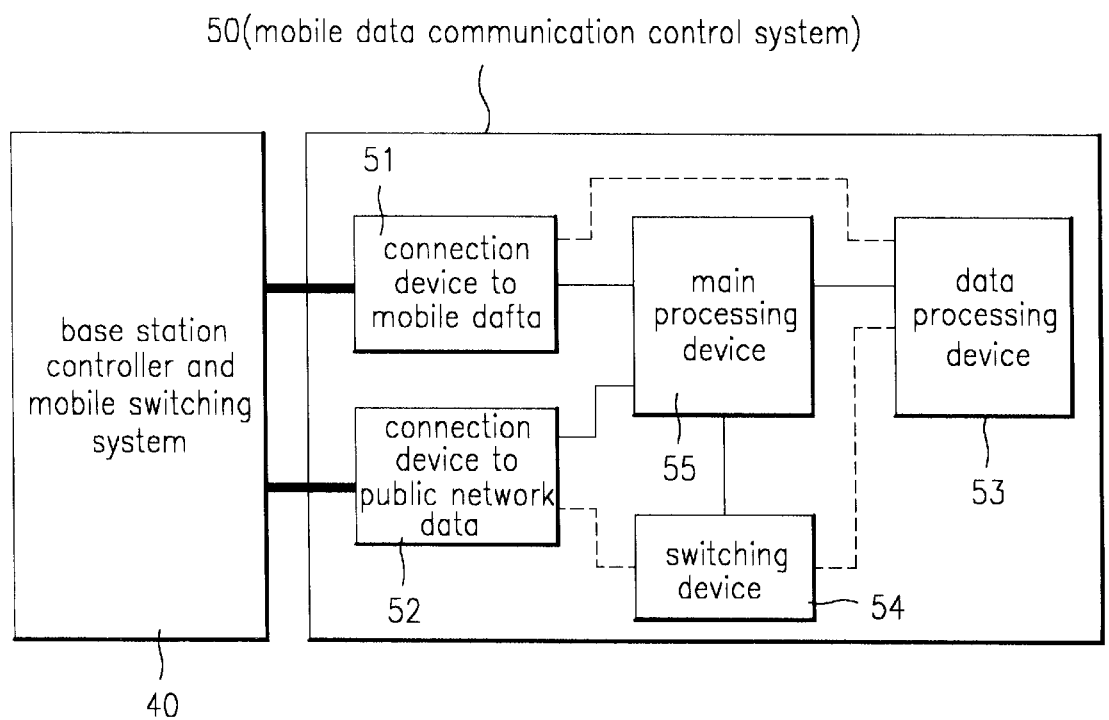
FIG. 2 is a block diagram illustrating construction of the mobile data communication control system of FIG. 1.
Figure 3:
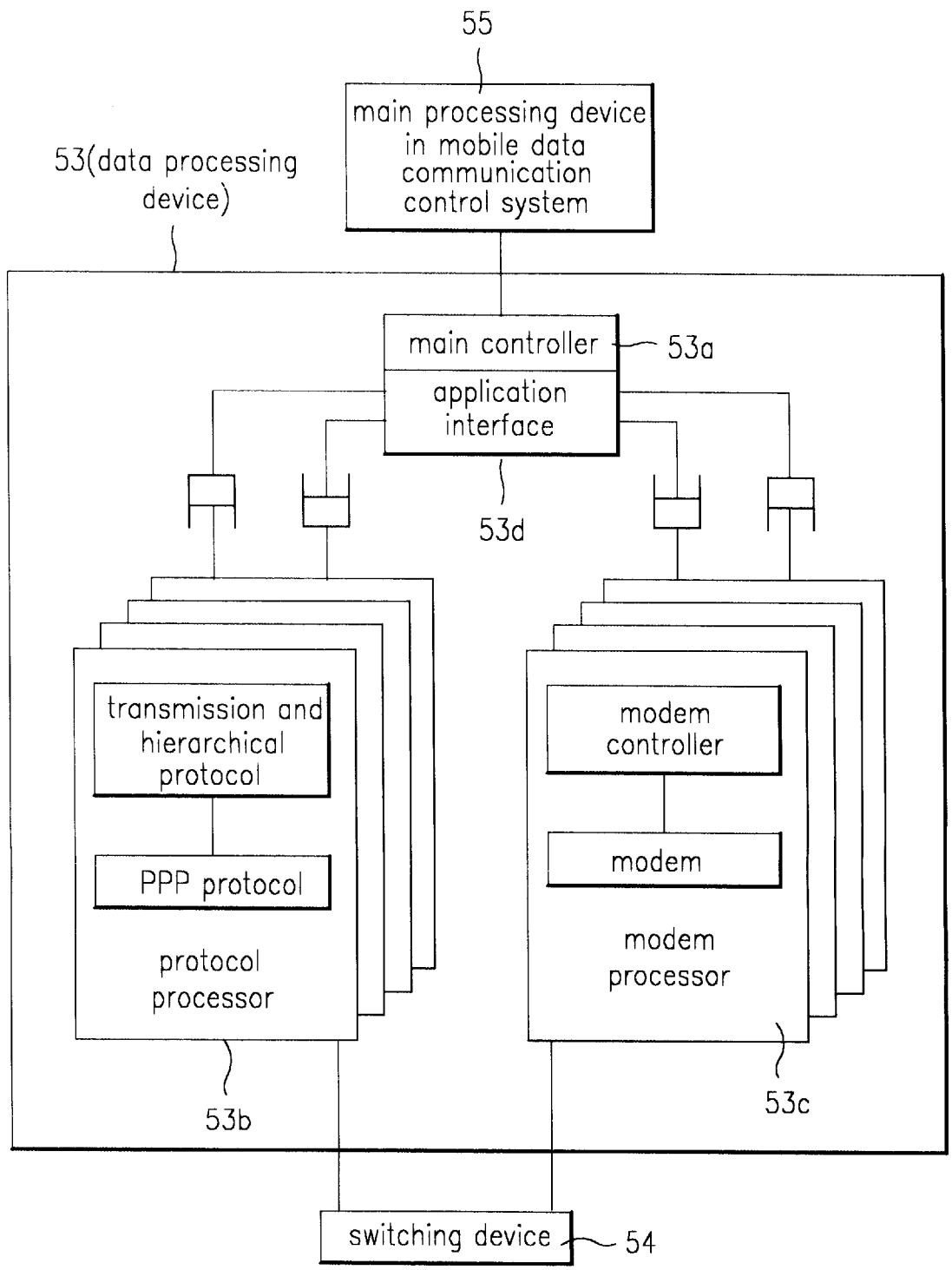
FIG. 3 is a block diagram illustrating a detailed construction of the data processing device of FIG. 2.
Figure 4A:
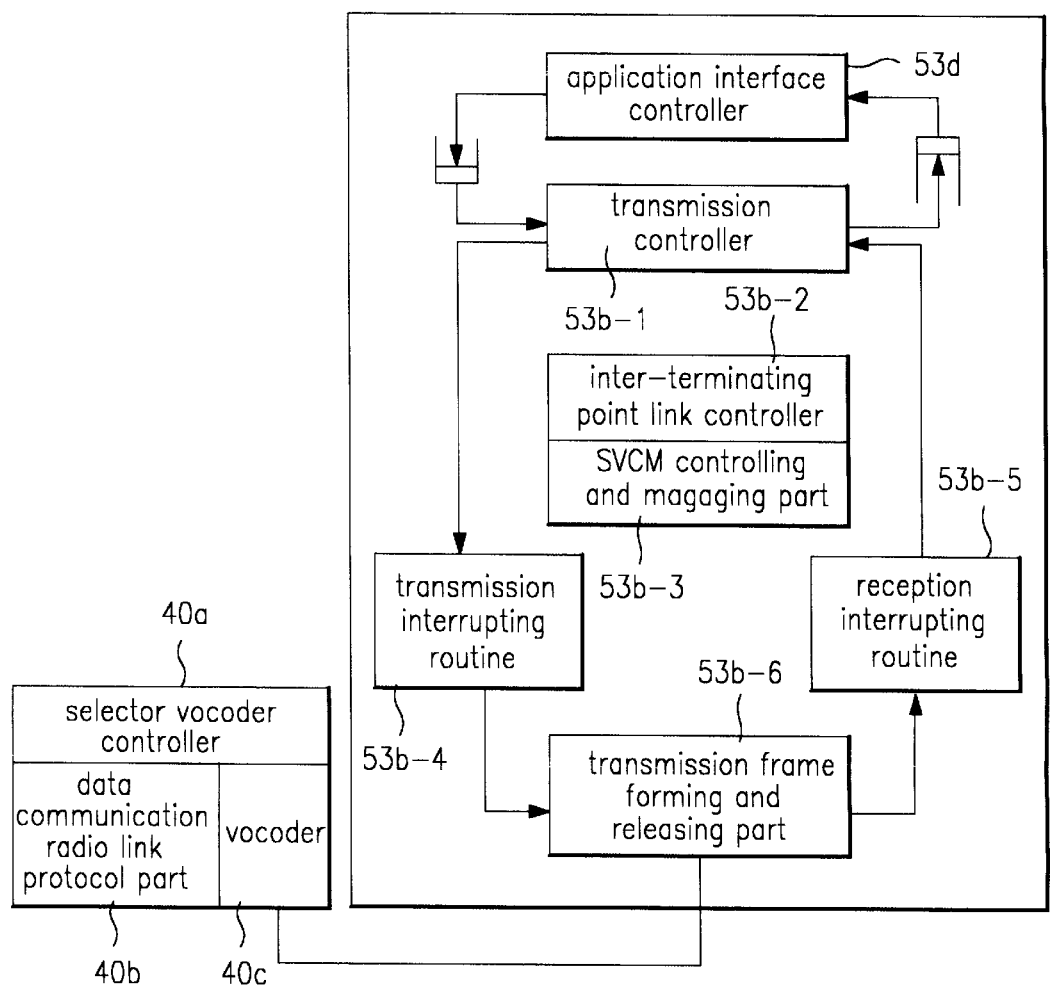
FIG. 4A is a block diagram illustrating construction of the selector vocorder control module (SVCM) of the base station controller of FIG. 2 and the protocol processor 53*b* of the base station controller 53 of FIG. 3.

As shown in FIG. 4A showing the construction of the selector vocorder control module (SVCM) of the base station controller of FIG. 2 and the protocol processor 53*b* of the base station controller 53 of FIG. 3, there are provided a transmission controller 53*b*-1, an inter-terminating point link controller 53*b*-2, an SVCM controlling and managing part 53*b*-3, a transmission interrupting routine 53*b*-4, a reception interrupting routine 53*b*-5, and a transmission frame forming and releasing part 53*b*-6.

The transmission controller 53*b*-1 detects and corrects error of data inputted/outputted to/from the application interface controller 53*d*. The inter-terminating point link controller 53*b*-2 builds a protocol stack between terminating points of link hierarchy, transmission hierarchy and application interface hierarchy between the data processing device 53 in the mobile data communication control system 50 and the second personal computer 80 after setting the mobile data path.

The transmission interrupting routine 53*b*-4 transmits data from the public network subscriber to the mobile communication subscriber and the reception interrupting routine 53*b*-5 transmits data from the mobile communication subscriber to the public network subscriber.

Finally, the SVCM controlling and managing part 53*b*-3 manages signalling with a selector vocorder controller 40*a* of the base station controller and mobile switching system 40, and the transmission frame forming and releasing part 53*b*-6 forms or releases a frame of transmitting/receiving data in a PCM system.

Figure 4B:
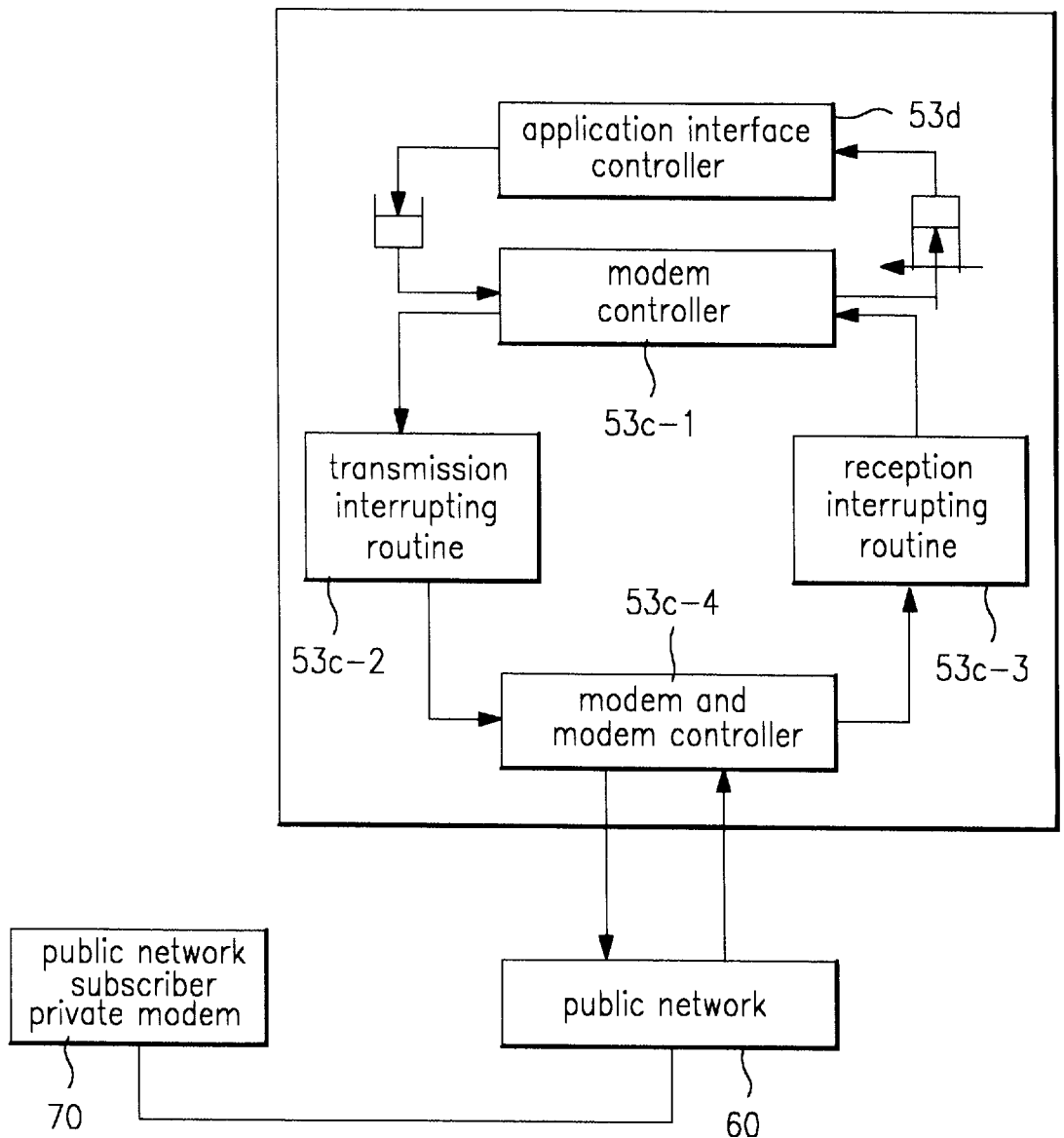
FIG. 4B is a block diagram illustrating construction between the modem processor of FIG. 3 and the modem of the public network subscriber.

As shown in FIG. 4B showing the construction between the modem processor 53*c* of FIG. 3 and the modem of the public network subscriber, there are provided a modem controller 53c-1, a transmission interrupting routine 53c-2, a reception interrupting routine 53c-3, and a modem and modem controller 53c-4.

The modem controller 53c-1 detects and corrects error of data inputted/outputted to/from the application interface controller 53d.

The transmission interrupting routine 53c-2 transmits data from the mobile communication subscriber to the public network subscriber, and the reception interrupting routine 53c-3 transmits data from the public network subscriber to the mobile communication subscriber.

Finally, the modem and modem controller 53c-4 is connected with the modem of the public network subscriber through the public network, for transmitting/receiving data to/from the modem.

Under the above construction, an explanation of operation of the CDMA mobile data communication system according to the present invention will be discussed.

Firstly, the mobile telephone subscriber requests communication connection with the public network subscriber.

The mobile telephone subscriber inputs and outputs an AT command for the mobile data communication from the first personal computer 10 of FIG. 1, and an originating call is transmitted to the selector vocorder controller 40a of the base station controller and mobile switching system 40. The selector vocorder controller 40a then checks whether it is the voice communication or mobile data communication and if it is checked that it corresponds to the data communication request message, transmits/receives in a predetermined frame format the signal message to/from the mobile data communication control system 50, to thereby set the mobile data path.

In other words, after the main processing device 55 which manages the connection device to the mobile data 51 of the mobile data communication control system 50 checks that the mobile telephone subscriber from the base station controller and mobile switching system 40 desires to execute the mobile data communication, the main processing device 55 assigns the idle modem resource and outputs a modem initializing command message to the data processing device 53 of the mobile data communication control system 50.

Then, the main controller 53a of the data processing device 53 which receives the modem initializing command message from the main processing device 55 of the mobile data communication control system 50, checks the occupying state of the idle mode resource and sets a modem basic construction value.

Then, the main controller 53a provides information containing success or failure relative to the modem initializing command message to the main processing device 55.

The main processing device 55 tries to connect the modem of the public network subscriber with the modem of the mobile data communication control system 50 in accordance with the modem initializing command message, and if the connection therebetween is made, the mobile telephone subscriber can execute the mobile data communication with the second personal computer 80 of the public network subscriber.

At the time, after setting the mobile data path, the protocol stack should be built between the terminating points of the link hierarchy, transmission hierarchy and application interface hierarchy between the data processing device 53 in the mobile data communication control system 50 and the second personal computer 80.

On the other hand, in the case where the mobile telephone subscriber during the mobile data communication performs a hand-off operation, or in the case where he or she passes through a tunnel region where a radio communication network can not be connected, since a data communication radio link protocol part 40b positioned under the selector vocorder controller 40a of the base station controller and mobile switching system 40 can not transmit/receive data to and from a data communication radio link protocol part positioned within the interior of the mobile telephone, these parts continually endeavor to transmit the data to each other.

If the transmission of the radio data is not executed during a predetermined time period, the data communication radio link protocol parts on both sides retry to execute an initial process to match their own synchronization.

Through these processes, the data transmission error rate can be minimized upon passing the radio section, and thus the number of data retransmission times transmitted/received between the terminating point users and the transmitted/received data transmission error rate can be all minimized.

The selector vocorder controller 40a of the base station controller and mobile switching system 40 is 21 bytes in size of buffer and has a queue being comprised of 265 entries, to thereby provide the data communication service.

After a predetermined time period elapses, however, if the order of data is incorrect and the error in the transmission packet between the inter-terminating point link controllers 53b-2, data transmission is retried through the higher rank of protocol module.

In this case, the higher rank of protocol module which receives the incorrect frame, discards the received frame and requests data retransmission, and as a result, the transmission load on the lower rank of construction is greatly increased. However, while the mobile telephone subscriber is during the data communication, if the data retransmission and the synchronous resetting is executed between the two data communication radio link protocol parts, the state of the selector vocorder controller 40a, after a predetermined time elapses, of the base station controller and mobile switching system 40 is checked when the public network subscriber transmits the call to the mobile telephone subscriber. As a result, an amount of data to be transmitted to the selector vocorder controller 40a of the base station controller and mobile switching system 40 can be adjusted.

On the other hand, FIG. 5A showing the frame format used in the mobile data path, that is, between the vocorder 40c of the base station controller and mobile switching system 40 and the transmission frame forming and releasing part 53b-6 of the mobile data communication control system 50.

In the frame format, there are provided the preamble 4 bytes in which information required in the vocorder 40c are stored and a message 4 bytes in which information required for transmitting/receiving data between the vocorder 40c and the mobile data communication control system 50 are stored.

The encoding packet 32 bytes include the data information and control signal of the mobile radio data communication.

The CRC 2 bytes is used for detecting and checking the error of transmission data.

The symbol "F" means a flag indicative of the end of data and is comprised of 1 byte having a value of 0×7E.

The idle pattern 117 bytes are used as a spare byte.

The frame having such the format as shown in FIG. 5A is used as the frame having the preamble 4 bytes, the message 4 bytes and the encoding packet 32 bytes in the SVCM controlling and managing part 53b-3, as shown in FIG. 5B.

On the other hand, in the encoding packet 32 bytes as shown in FIG. 5C, first 1 byte as a traffic channel data rate indicates a transmission pattern of data within the radio section, second 1 byte as a traffic information format indicates null traffic or data traffic, and third 1 byte as a control signal code indicates the contents of signal information between the selector vocorder controller 40a of the base station controller and mobile switching system 40 and the SVCM controlling and managing part 53b-3 of the mobile data communication control system 50.

Fourth 1 byte as information frame management number indicates the management number of information frame transmitted/received between the selector vocorder controller 40a of the base station controller and mobile switching system 40 and the SVCM controlling and managing part 53b-3 of the mobile data communication control system 50.

Fifth to eighth 1 byte are not used for another purpose and the following 20 bytes indicates data information to be transmitted to the counterpart. The last 4 bytes are not yet used.

Generally, the size of information transmitted in the selector vocorder controller 40a of the base station controller and mobile switching system 40 is 21 bytes, 1 byte of which is used for the purpose of information order of the radio section.

The information frame management number corresponding to the fourth 1 byte of the encoding packet is increased by one only in case of the data packet and is not increased in case of a voice communication signal or null traffic.

Meanwhile, a control signal type and code in the control signal code corresponding to the third 1 byte of the encoding packet is as follows:

A signal O×11 in the control signal code indicates a reception-possible control signal, which is used when the selector vocorder controller 40a of the base station controller and mobile switching system 40 can continually receive the data from the mobile data communication control system 50.

A signal O×22 indicates an SVCM reception-impossible control signal, which is used when the selector vocorder controller 40a of the base station controller and mobile switching system 40 can not temporarily receive the data from the mobile data communication control system 50.

A signal O×33 indicates a specific information frame retransmission request control signal, which is used when the retransmission of a specific information frame received from the mobile data communication control system 50 is requested. As a result, the mobile data communication control system 50 which has received the control signal, retransmits the next information frame, including the corresponding information frame.

A signal O×44 indicates a control signal of acknowledging the data reception, which is used when the information frame of previously received data is received without any problem. In case of the retransmission frame, the control signal of acknowledging the data reception is not transmitted.

The selector vocorder controller 40a of the base station controller and mobile switching system 40 can increase a transmission efficiency of data provided from the public network by transmitting these control signals to the mobile data communication control system 50 in accordance with the transmitting/receiving current states accumulated relative to abnormal environment of the radio section.

As clearly appreciated from the above, a data control system in a CDMA mobile communication system according to the present invention can achieve data communication with a public network subscriber, even if a modem is not mounted on a computer of a mobile telephone subscriber, and simultaneously increase a transmission efficiency of mobile data in the mobile communication network by controlling and managing data information frame between a mobile data communication control system and an SVCM of a base station controller.

It will be apparent to those skilled in the art that various modifications and variations can be made in a data control system in a CDMA mobile communication system of the present invention without departing from the spirit or scope of the invention. Thus, it is intended that the present invention cover the modifications and variations of this invention provided they come within the scope of the appended claims and their equivalents.

What is claimed is:

1. A data control system in a CDMA mobile communication system having a mobile telephone in which a serial input/output port connectable to a computer is provided, a base station for receiving/transmitting a radio wave applied from each mobile telephone of a mobile telephone subscriber, and a base station controller and mobile switching system for controlling said base station and for exchanging a voice signal by connecting the radio base stations to each other, said data control system comprising:

a connection device to mobile data for receiving an asynchronous mobile data communication service request message by the mobile telephone subscriber from said base station controller and mobile switching system and if communication is made with a public network subscriber, for transmitting/receiving asynchronous mobile data to/from the mobile telephone subscriber along a mobile data path through said base station controller and mobile switching system;

a connection device to public network data for receiving the asynchronous mobile data communication service request message by a public network subscriber from said base station controller and mobile switching system and if communication is made with the mobile telephone subscriber, for transmitting/receiving the asynchronous mobile data to/from the public network subscriber along a public network data path through said base station controller and mobile switching system;

a data processing device for modem-processing the asynchronous mobile data from the mobile telephone subscriber by occupying an idle modem resource for asynchronous mobile data communication and by connecting a channel to the mobile telephone subscriber to thereby output the processed data as the public network data and for protocol-processing the asynchronous mobile data from the public network subscriber by assigning a modem resource of a modem port and by connecting one channel to the public network data to thereby output the processed data as the mobile data;

a switching device for outputting the asynchronous mobile data outputted from said data processing device to said connection device to the public network data and for outputting the asynchronous mobile data from the public network subscriber to said connection device to the mobile data, while transmitting the asynchronous mobile data from said connection device to the mobile data and said connection device to the public network data to said data processing device; and a main processing device for assigning the idle modem resource for the asynchronous mobile data communication, if the asynchronous mobile data communication service request exists by the mobile telephone subscriber from said connection device to the mobile data and then for checking whether the idle modem resource is occupied by said data processing device and said connection state of the channel for the mobile data path, to thereby set the mobile data path between said data processing device and said connection device to the mobile data through said switching device and at the same time for checking the modem resource in which modem environment is constructed by using the channel for the mobile data path of said data processing device and the connection state of the one channel assigned to the public network data, to thereby set the public network data path between said data processing device and said connection device to the public network data through said switching device.

2. The data control system as defined in claim 1, wherein said data processing device comprises:

a main controller for occupying the idle modem resource in accordance with the signal from said main processing device, controlling the connection of channel for the mobile data path, and constituting a user modem environment using the channel for the mobile data path by said main processing device, based upon the setting of the mobile data path;

a protocol processor for inputting and outputting the asynchronous mobile data from the mobile telephone subscriber from said switching device through the channel B port assigned by said main controller and for converting the asynchronous mobile data from the public network subscriber inputted through the public network path to be adapted for the channel B communication to thereby output the converted data to said switching device;

a modem processor for detecting a carrier, if incoming and calling command signals are inputted from said main processing device, and if link between modems is set, for inputting the asynchronous mobile data from the public network subscriber from said switching device to thereby output the inputted data to said protocol processor and for inputting and modem-processing the asynchronous mobile data from the mobile telephone subscriber outputted from said protocol processor to thereby output the processed data to said switching device; and an application interface controller for interfacing data between said protocol processor and said modem processor and for transmitting the command of the main controller to each of said protocol processor and said modem processor.

3. The data control system as defined in claim 2, wherein said protocol processor comprises:

a transmission controller for detecting and correcting error of data inputted/outputted to/from said application interface controller;

an inter-terminating point link controller for building a protocol stack between terminating points of link hierarchy, transmission hierarchy and application interface hierarchy between said data processing device in said mobile data communication control system and a personal computer after setting the mobile data path;

a transmission interrupting routine for transmitting data from the public network subscriber to the mobile communication subscriber;

a reception interrupting routine for transmitting data from the mobile communication subscriber to the public network subscriber;

a Selector Vocorder Control Module controlling and managing part for managing signaling with a selector vocorder controller of said base station controller and mobile switching system; and a transmission frame forming and releasing part for forming or releasing a frame of transmitting/receiving data in a PCM system.

4. The data control system as defined in claim 2, wherein said modem processor comprises:

a modem controller for detecting and correcting error of data inputted/outputted to/from said application interface controller;

a transmission interrupting routine for transmitting data from the mobile communication subscriber to the pubic network subscriber;

a reception interrupting routine for transmitting data from the public network subscriber to the mobile communication subscriber; and a modem and a modem controller connected with a modem of the public network subscriber through the public network, for transmitting/receiving data to/from the modem.

* * * * *